(12) United States Patent
Chen

(10) Patent No.: US 12,662,060 B2
(45) Date of Patent: Jun. 23, 2026

(54) CROSS BAR ASSEMBLY AND ROOF RACK

(71) Applicant: Jichao Zeng, Leshan (CN)

(72) Inventor: Ran Chen, Ningbo (CN)

(73) Assignee: Jichao Zeng, Leshan (CN)

( * ) Notice: Subject to any disclaimer, the term of this patent is extended or adjusted under 35 U.S.C. 154(b) by 182 days.

(21) Appl. No.: 18/473,149

(22) Filed: Sep. 22, 2023

(65) Prior Publication Data

US 2025/0083612 A1     Mar. 13, 2025

(30) Foreign Application Priority Data

Sep. 7, 2023     (CN) ......................... 202322436787.3

(51) Int. Cl.
B60R 9/052 (2006.01)
B60R 9/058 (2006.01)

(52) U.S. Cl.
CPC .............. B60R 9/052 (2013.01); B60R 9/058 (2013.01)

(58) Field of Classification Search
CPC ................................ B60R 9/052; B60R 9/058
See application file for complete search history.

(56) References Cited

U.S. PATENT DOCUMENTS

| | | | | |
|---|---|---|---|---|
| 3,525,461 A | * | 8/1970 | Bronson | ................. B60R 9/058 |
| | | | | 70/229 |
| 4,586,638 A | * | 5/1986 | Prescott | ................. B60R 9/058 |
| | | | | 224/322 |
| 5,794,826 A | * | 8/1998 | Cronce | ................... B60R 9/045 |
| | | | | 116/282 |
| 7,328,824 B2 | * | 2/2008 | Smith | ..................... B60R 9/058 |
| | | | | 224/326 |
| 9,352,696 B2 | * | 5/2016 | Gorey | ....................... B60R 9/04 |
| 10,625,684 B1 | * | 4/2020 | Schafer, Jr. | ............. B60R 9/058 |
| 11,518,316 B1 | | 12/2022 | Weng | |
| 2022/0032853 A1 | * | 2/2022 | McFadden | .............. B60R 9/058 |
| 2022/0274532 A1 | | 9/2022 | Olaison et al. | |
| 2023/0117288 A1 | | 4/2023 | Schwecke et al. | |

FOREIGN PATENT DOCUMENTS

| | | | | | |
|---|---|---|---|---|---|
| FR | | 2980423 A1 | * | 3/2013 | ............. B60R 9/052 |
| WO | WO-2023174854 A1 | | * | 9/2023 | ................ B60P 7/08 |

* cited by examiner

*Primary Examiner* — Scott T Mcnurlen

(57) ABSTRACT

The cross bar assembly comprises a first connecting structure, a second connecting structure and a connecting portion; the first connecting structure is connected to the roof guide rail, the first connecting structure is connected to the second connecting structure in a lockable manner, and the second connecting structure is connected to the connecting portion. The roof rack includes the cross bar assembly above, and the roof rack also includes the roof guide rail; when the first connecting structure locks the second connecting structure, the second connecting structure is mounted on the roof guide rail by using the first connecting structure, and the second connecting structure cannot be detached from the roof guide rail, and when the first connecting structure is unlocked from the second connecting structure, the second connecting structure can be detached from the roof guide rail, thereby preventing other people from stealing the cross bar assembly.

12 Claims, 4 Drawing Sheets

CROSS BAR ASSEMBLY AND ROOF RACK

TECHNICAL FIELD

The present application relates to the field of automobiles, in particular to a cross bar assembly and a roof rack.

BACKGROUND

The main function of a cross bar of the roof rack is to enhance the bearing capacity of a luggage rack, ensuring the safety thereof when a relatively large external force is applied. In addition, if there is no supporting point when there is no cross bar, the supporting function cannot be achieved, which tends to cause an external force acting on the roof. As a result, the roof is recessed and is damaged. Therefore, a cross bar needs to be added when placing articles, especially large things. However, the cross bar in the prior art is detachably mounted on the roof rack, and is easily stolen.

SUMMARY

Accordingly, there is a need to provide a cross bar assembly so as to solve at least one of the problems above.

The present application provides a cross bar assembly for connecting a roof guide rail, including a first connecting structure, a second connecting structure and a connecting portion, in which the first connecting structure is connected to the roof guide rail, the first connecting structure is connected to the second connecting structure in a lockable manner, and the second connecting structure is connected to the connecting portion.

Further, the first connecting structure further includes a lock and a key, and the first connecting structure is connected to the second connecting structure in a lockable manner by means of the lock and the key.

Further, the lock includes a lock hole, a lock core and a lock tongue, in which the lock core is mounted in the lock hole, and the lock tongue is connected to the lock core and is in linkage with the lock core, the lock tongue is provided close to the second connecting structure, and a connecting hole is provided at a position of the second connecting structure close to the lock tongue, the lock tongue is connected to the connecting hole in a snap-fit manner, and when the lock tongue is snap-fitted with the connecting hole, the first connecting structure is locked onto the second connecting structure, and when the lock tongue is disengaged from the connecting hole, the first connecting structure is unlocked from the second connecting structure.

Further, the first connecting structure is detachably connected to the roof guide rail.

Further, the first connecting structure includes a cover and a fixing member, and two ends of the fixing member are detachably connected to the cover and the roof guide rail respectively, so that the first connecting structure can be detachably connected to the roof guide rail.

Furthermore, the fixing member includes a head portion and a tail portion, the cover is provided with a through-hole, the head portion is located at a side of the cover away from the roof guide rail, the size of the head portion is greater than the diameter of the through-hole and thus the head portion cannot pass through the through-hole, the size of the tail portion is smaller than the diameter of the through-hole and thus the tail portion can pass through the through-hole, the tail portion passes through the through-hole and is detachably connected to the roof guide rail, so that the fixing member connects the cover to the roof guide rail detachably.

Further, the second connecting structure is movably connected to the connecting portion.

Further, the number of both the first connecting structure and the second connecting structure is two, the number of the roof guide rail is also two, and the two first connecting structures are correspondingly connected to the two roof guide rails respectively, the two first connecting structures are connected to the two second connecting structures respectively in a lockable manner, and the connecting portion is provided between the two first connecting structures, and two ends of the connecting portion are respectively connected to the two second connecting structures.

Furthermore, each of the two second connecting structures includes a first adjustment structure, the two ends of the connecting portion are provided with a second adjustment structure at the position corresponding to the first adjustment structure, and the first adjustment structure is slidably connected to the second adjustment structure.

With respect to the cross bar assembly, when the first connecting structures lock the second connecting structures, the second connecting structures are mounted on the roof guide rails by means of the first connecting structures, the second connecting structures cannot be detached from the roof guide rails, and when the first connecting structures are unlocked from the second connecting structures, the second connecting structures can be detached from the roof guide rails, thereby preventing other people from stealing the cross bar assembly.

In a second aspect, the present application further provides a roof rack, including the cross bar assembly according to any one of the foregoing. The roof rack further includes roof guide rails.

As the described roof rack uses the described cross bar assembly, when the first connecting structures lock the second connecting structures, the second connecting structures are mounted on the roof guide rails by means of the first connecting structures, the second connecting structures cannot be detached from the roof guide rails, and when the first connecting structures are unlocked from the second connecting structures, the second connecting structures can be detached from the roof guide rails, thereby preventing other people from stealing the cross bar assembly.

BRIEF DESCRIPTION OF THE DRAWINGS

The accompanying drawings are only used for exemplary description and should not be understood as limitations to the present disclosure, and the same reference signs are used for components with the same structure and function, in which.

Figure 1:
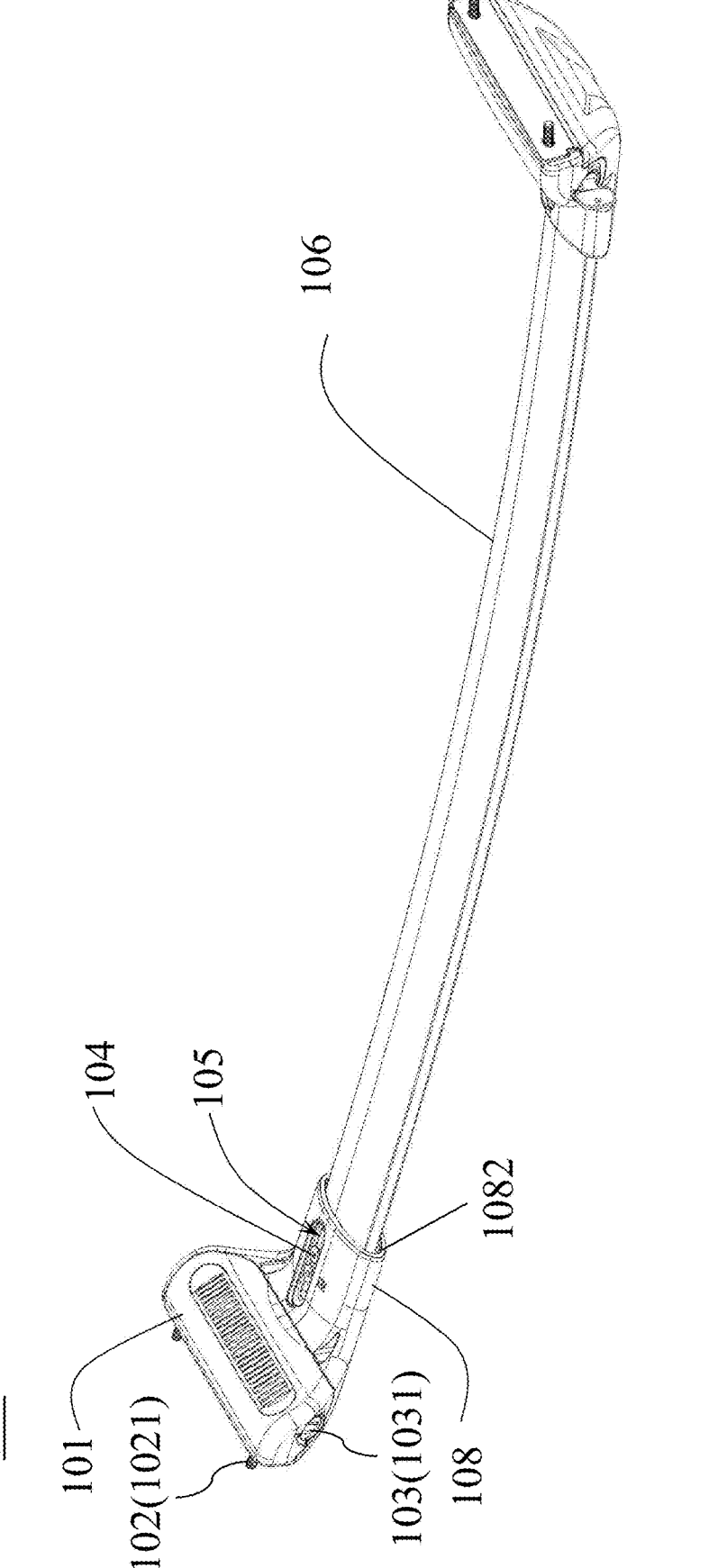
FIG. 1 is a schematic diagram showing the overall structure of a cross bar assembly according to one embodiment of the present disclosure.
Figure 2:
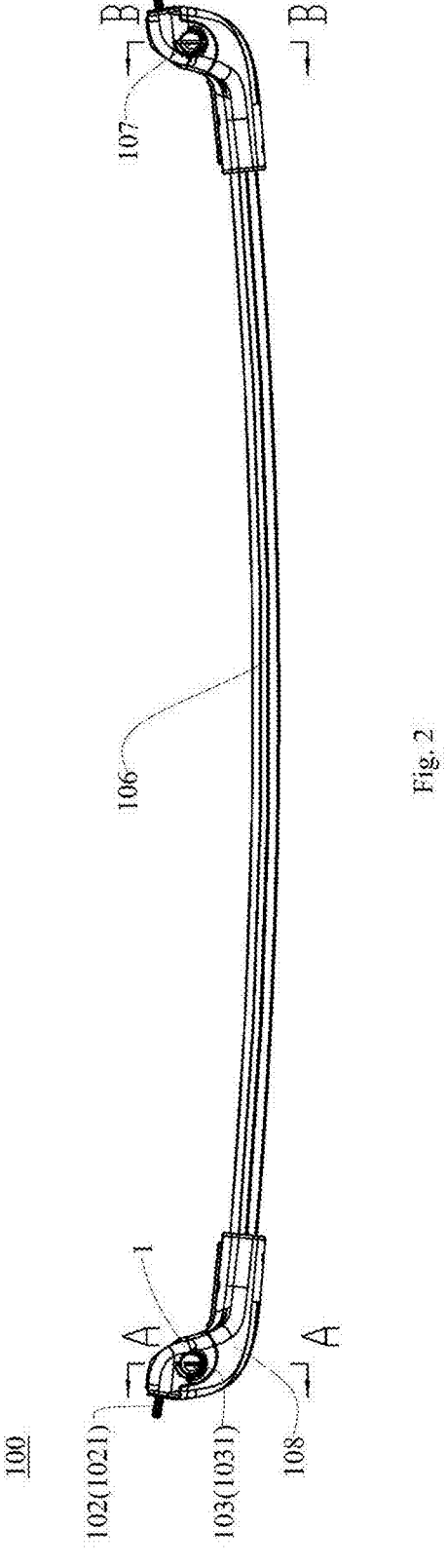
FIG. 2 is a structural schematic diagram of a front view of a cross bar assembly according to one embodiment of the present disclosure.
Figure 3:
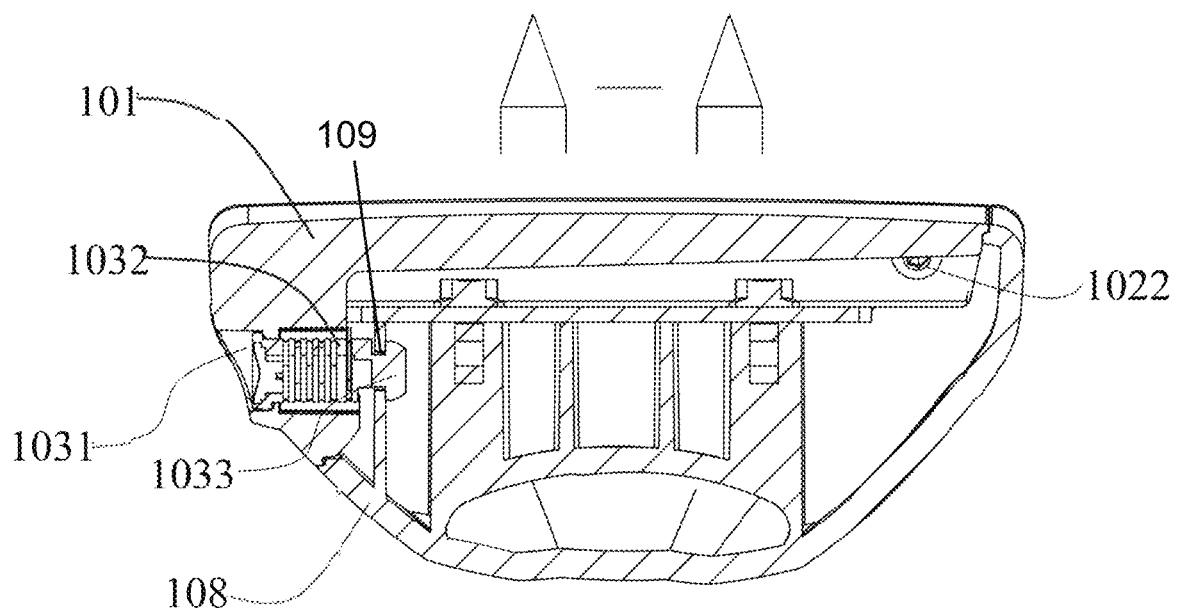
FIG. 3 is a schematic diagram of a sectional view in a direction A-A in FIG. 2.
Figure 4:
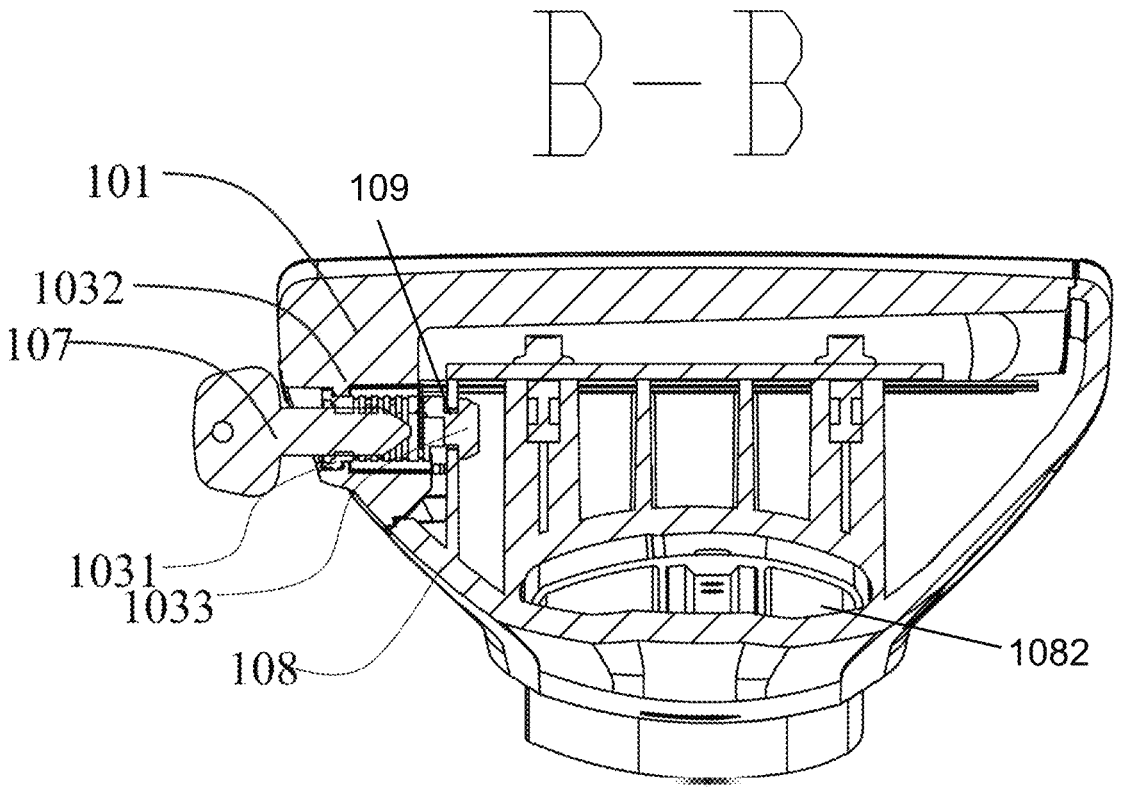
FIG. 4 is a schematic diagram of a sectional view in a direction B-B in FIG. 2.

Description of reference signs: cross bar assembly—100; first connecting structure—101; fixing member—102; tail portion—1021; head portion—1022; lock—103; lock hole—1031; lock core—1032; lock tongue—1033; first adjustment structure—104; second adjustment structure—105; connecting portion—106; key—107; second connecting structure—108; connecting hole—109; roof rack—200; roof guide rail—201.

DETAILED DESCRIPTION

The technical solutions in the embodiments of the present application are described as follows with reference to the accompanying drawings in the embodiments of the present application. In the description of the embodiments of the present application, unless otherwise specified, "/" indicates or, for example, A/B may indicate A or B; the expression "and/or" herein is only used for describing the association relationship of the associated objects and indicates that three relationships may exist, for example, A and/or B may indicate: only A exists, A and B exist at the same time, and only B exists. In addition, in the description of the embodiments of the present application, "a plurality of" means two or more than two.

Hereinafter, the terms "first" and "second" are only used for description, and cannot be understood as indicating or implying relative importance or implicitly indicating the number of indicated technical features. Thus, the features defined by "first" and "second" may explicitly or implicitly include one or more of the features.

Please refer to FIGS. 1-4, in the present embodiment, exemplarily, a cross bar assembly 100 is used for connecting a roof guide rail 201, comprising a first connecting structure 101, a second connecting structure 108 and a connecting portion 106, in which the first connecting structure 101 is connected to the roof guide rail 201, the first connecting structure 101 is connected to the second connecting structure 108 in a lockable manner, and the second connecting structure 108 is connected to the connecting portion 106, specifically, one end of the second connecting structure 108 is connected to the first connecting structure 101 in a lockable manner, and another end of the second connecting structure 108 is axially provided with a hole 1082, one end of the connecting portion 106 is connected in the hole 1082; in this way, when the first connecting structure 101 locks the second connecting structure 108, the second connecting structure 108 is mounted onto the roof guide rail 201 by means of the first connecting structure 101, and the second connecting structure 108 cannot be detached from the roof guide rail 201; and when the first connecting structure 101 is disengaged from the second connecting structure 108, the second connecting structure 108 can be detached from the roof guide rail 201, thereby preventing other people from stealing the cross bar assembly 100.

Specifically, the first connecting structure 101 further includes a lock and a key 107, and the first connecting structure 101 is connected to the second connecting structure 108 in a lockable manner by means of the lock and the key 107.

Specifically, the lock includes a lock hole 1031, a lock core 1032 and a lock tongue 1033, in which the lock core 1032 is mounted in the lock hole 1031, the lock tongue 1033 is connected to the lock core 1032 and is in linkage with the lock core 1032, the lock tongue 1033 is provided close to the second connecting structure 108, a connecting hole 109 is provided at a position of the second connecting structure 108 close to the lock tongue 1033, the lock tongue 1033 is connected to the connecting hole 109 in a snap-fit manner, and when the lock tongue 1033 is connected to the connecting hole 109 in a snap-fit manner, the first connecting structure 101 is locked onto the second connecting structure 108, and when the lock tongue 1033 is disengaged from the connecting hole 109, the first connecting structure 101 is unlocked from the second connecting structure 108.

Specifically, the lock tongue 1033 is provided with a clamping groove at a position corresponding to the connecting hole 109, the connecting hole 109 is elliptical, and the long side size of the elliptical shape is greater than the maximum outer contour size of a portion of the lock tongue 1033 without a clamping groove so as to allow the lock tongue 1033 to pass through the connecting hole 109, the short side size of the elliptical shape is less than the maximum outer contour size of the portion of the lock tongue 1033 without a clamping groove but greater than the maximum outer contour size of the portion of the lock tongue 1033 with a clamping groove so as to allow the clamping groove of the lock tongue 1033 to be clamped with the connecting hole 109, when the lock tongue 1033 is connected to the connecting hole 109 in a snap-fit manner, the lock tongue 1033 is rotated to a direction parallel to the short side of the elliptical shape, and the clamping groove of the lock tongue 1033 is clamped with the connecting hole 109, the lock tongue 1033 cannot pass through the connecting hole 109, the first connecting structure 101 is locked onto the second connecting structure 108, and when the lock tongue 1033 is disengaged from the connecting hole 109, the lock tongue 1033 is rotated to a direction parallel to the long side of the elliptical shape, and at this time, the lock tongue 1033 can pass through the connecting hole 109 to unlock the first connecting structure 101 from the second connecting structure 108.

Specifically, the connection manner of the lock tongue 1033 and the lock core 1032 may be integrally forming, clamping, screwing, and so on, but not limited thereto.

In particular, the first connecting structure 101 is detachably connected to the roof guide rail 201.

Specifically, the first connecting structure 101 comprises a cover and a fixing member 102, two ends of the fixing member 102 are detachably connected to the cover and the roof guide rail 201 respectively; in this way, the first connecting structure 101 can be detachably connected to the roof guide rail 201.

Specifically, the fixing member 102 comprises a head portion 1022 and a tail portion 1021, the cover is provided with a through-hole, the head portion 1022 is located at a side of the cover away from the roof guide rail 201, the size of the head portion 1022 is greater than the diameter of the through-hole and the head portion cannot pass through the through hole, the size of the tail portion 1021 is less than the diameter of the through-hole and the tail portion can pass through the through-hole, the tail portion 1021 passes through the through-hole and is detachably connected to the roof guide rail 201, and thus the fixing member 102 connects the cover detachably to the roof guide rail 201.

Specifically, a bolt head is located at a side of the cover away from the roof guide rail 201, the size of the bolt head is greater than the diameter of the through-hole and the bolt head cannot pass through the through-hole, the size of a bolt tail is less than the diameter of the through-hole and the bolt tail can pass through the through-hole, the bolt tail passes through the through-hole and is detachably connected to the roof guide rail 201, and thus the fixing member 102 connects the cover detachably to the roof guide rail 201.

In particular, the second connecting structure 108 is movably connected to the connecting portion 106.

Specifically, the number of both the first connecting structure 101 and the second connecting structure 108 is two, and the number of the roof guide rail 201 is also two, the two first connecting structures 101 are correspondingly connected to the two roof guide rails 201 respectively, and the two first connecting structures 101 are respectively connected to two second connecting structures 108 in a lockable manner, the connecting portion 106 is provided between the two first connecting structures 101, and two ends of the connecting portion 106 are connected to the two second connecting structures 108 respectively.

Specifically, each of the two second connecting structures 108 includes a first adjustment structure 104, the two ends of the connecting portion 106 are provided with a second adjustment structure 105 at the position corresponding to the first adjustment structure 104, and the first adjustment structures 104 are slidably connected to the second adjustment structures 105; in this way, the connecting portion 106 can be slidably connected to the second connecting structures 108, when the size of the connecting portion 106 changes, the distance between the two second adjustment structures 105 corresponding to the two ends of the connecting portion 106 respectively changes, however, the two first adjustment structures 104 respectively corresponding to the two second connecting structures 108 still maintain the initial position; by sliding the second adjustment structures 105 along the first adjustment structures 104, the connecting portion 106 is still able to adapt the two second connecting structures 108 to be mounted between the two second connecting structures 108.

Specifically, the first adjustment structures 104 are adjustment bolts, the second adjustment structures 105 are strip-shaped grooves, and the adjustment bolts are slidably connected to the strip-shaped grooves, so that the second connecting structures 108 can be movably connected to the connecting portion 106.

Specifically, the connecting portion 106 is a connecting rod.

Figure 5:
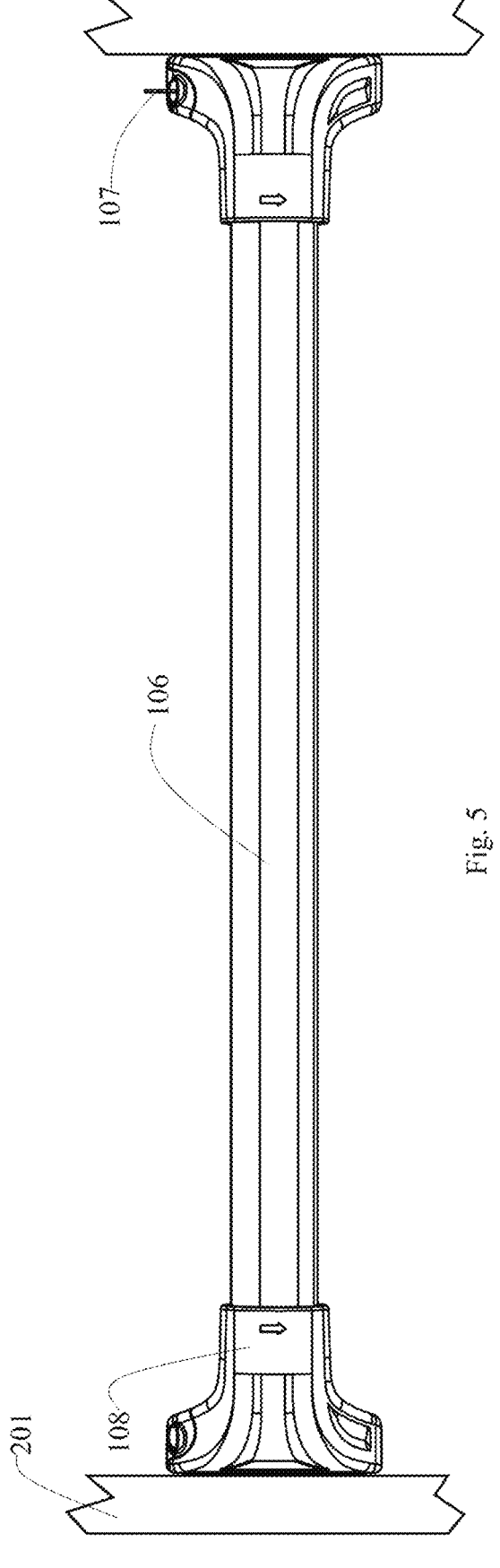
FIG. 5 is a structural schematic diagram of a top view of a roof rack according to one embodiment of the present application.

Please refer to FIG. 5, the embodiments of the present application further provide a roof rack 200, which includes the cross bar assembly 100 in any one of the described embodiments. The roof rack 200 further includes a roof guide rail 201.

As the described cross bar assembly 100 is used for the described roof rack 200, when the first connecting structures 101 lock the second connecting structures 108, the second connecting structures 108 are mounted on the roof rack 201 by means of the first connecting structures 101, and the second connecting structures 108 cannot be detached from the roof guide rail 201, when the first connecting structures 101 are unlocked from the second connecting structures 108, the second connecting structures 108 can be detached from the roof guide rail 201, thereby preventing other people from stealing the cross bar assembly 100.

In the description of this embodiment, unless otherwise specified, "a plurality of" means two or more. The described content is merely specific embodiments of the present application, but the scope of protection of the present application is not limited thereto. Any change or replacement within the technical scope disclosed in the present application shall belong to the scope of protection of the present application. Therefore, the scope of protection of the present application shall be subject to the scope of protection of the claims.

What is claimed is:

1. A cross bar assembly, comprising
a first connecting structure,
a second connecting structure, and a connecting portion,
wherein one end of the first connecting structure is configured to be connected to a roof guide rail, another end of the first connecting structure is connected to one end of the second connecting structure in a lockable manner, and another end of the second connecting structure is axially provided with a hole, one end of the connecting portion is connected in the hole;
wherein the first connecting structure comprises a lock and the second connecting structure comprises a connecting hole; the first connecting structure is connected to the second connecting structure by an engagement between the lock and the connecting hole; the hole and the connecting hole are formed in a one-piece structure of the second connecting structure.

2. The cross bar assembly according to claim 1, wherein the first connecting structure further comprises a key, and the first connecting structure is connected to the second connecting structure in a lockable manner by the lock and the key.

3. The cross bar assembly according to claim 2, wherein the lock comprises a lock hole, a lock core, and a lock tongue, the lock core is mounted in the lock hole, the lock tongue is connected to the lock core and is in linkage with the lock core, and the lock tongue is connected to the connecting hole, when the lock tongue is engaged with the connecting hole, the first connecting structure is locked onto the second connecting structure, and when the lock tongue is disengaged from the connecting hole, the first connecting structure is unlocked from the second connecting structure.

4. The cross bar assembly according to claim 1, wherein the first connecting structure is detachably connected to the roof guide rail.

5. The cross bar assembly according to claim 4, wherein the first connecting structure comprises a cover and a fixing member, and two ends of the fixing member are detachably connected to the cover and the roof guide rail respectively, so that the first connecting structure can be detachably connected to the roof guide rail.

6. The cross bar assembly according to claim 5, wherein the fixing member comprises a head portion and a tail portion, the cover is provided with a through-hole, the head portion is located at a side of the cover away from the roof guide rail, the size of the head portion is greater than the diameter of the through-hole and thus the head portion cannot pass through the through-hole, the size of the tail portion is smaller than the diameter of the through-hole and thus the tail portion can pass through the through-hole, the tail portion passes through the through-hole and is detachably connected to the roof guide rail, and the fixing member connects the cover to the roof guide rail detachably.

7. The cross bar assembly according to claim 1, wherein the second connecting structure is movably connected to the connecting portion.

8. The cross bar assembly according to claim 7, wherein a number of both the first connecting structure and the second connecting structure is two, a number of the roof guide rail is also two, and the two first connecting structures are correspondingly connected to the two roof guide rails respectively, the two first connecting structures are connected to the two second connecting structures respectively in a lockable manner, and the connecting portion is provided between the two first connecting structures, and two ends of the connecting portion are respectively connected to the two second connecting structures.

9. The cross bar assembly according to claim 8, wherein each of the two second connecting structures comprises a first adjustment structure, two ends of the connecting portion are provided with a second adjustment structure at a position corresponding to the first adjustment structure, and the first adjustment structure is slidably connected to the second adjustment structure.

10. A roof rack, comprising the cross bar assembly of claim 1 and the roof guide rail, wherein the cross bar assembly is connected to the roof guide rail.

11. The cross bar assembly according to claim 1, wherein the second connecting structure comprises a first adjustment structure, the connecting portion comprises a second adjustment structure, the first adjustment structure is slidably connected to the second adjustment structure; two ends of the second adjustment structure stop the first adjustment structure from further sliding, such that the first adjustment structure is limited to slide in the second adjustment structure.

12. The cross bar assembly according to claim 11, wherein the first adjustment structure is an adjustment bolt, the second adjustment structure is a strip-shaped groove, the adjustment bolt being slidably received in the strip-shaped groove.

\* \* \* \* \*